United States Patent [19]

Hazzard

[11] 3,864,736

[45] Feb. 4, 1975

[54] MAGNETIC RECORDING VERIFICATION

[75] Inventor: Michael J. Hazzard, Exton, Pa.

[73] Assignee: Burroughs Corporation, Detroit, Mich.

[22] Filed: June 25, 1973

[21] Appl. No.: 373,270

[52] U.S. Cl. .................................................. 360/53
[51] Int. Cl. .............................................. G11b 5/09
[58] Field of Search ................................ 360/51, 53

[56] References Cited

UNITED STATES PATENTS

| | | | |
|---|---|---|---|
| 3,368,211 | 2/1968 | Taris | 360/53 |
| 3,656,125 | 4/1972 | Kanda | 360/53 |

*Primary Examiner*—Vincent P. Canney
*Attorney, Agent, or Firm*—Leonard C. Brenner; Edward J. Feeney, Jr.; Edward G. Fiorito

[57] ABSTRACT

Apparatus and method for bit by bit verification of digital data, serially recorded onto a magnetic medium wherein data verification occurs immediately upon recording. Data, traveling serially to a recording head, may be sampled in parallel-bit characters which in turn can be stored while that data is being recorded. Recorded data may then be read from the medium and compared with the stored characters to verify the accuracy of the recording wherein each bit of each character, in the serial order of its recording, can be compared with the corresponding data bit read from the medium. The entire recording and comparison process may be conducted in synchronism with strobe pulses recorded on the medium.

8 Claims, 3 Drawing Figures

MAGNETIC RECORDING VERIFICATION

BACKGROUND OF THE INVENTION

Magnetic recording verification especially verification of data deposited on magnetic tape has been taught in prior art for assuring the accuracy of a recording. One verification approach has been to record the data onto tape and then rerun the tape reading the recorded data and comparing it with a copy of the input data held temporarily in storage. This approach requires a large temporary memory for holding input data and in addition, is also very time consuming, requiring the tape to pass over the head at least three times. An alternate approach has been to employ two heads, one for writing and the other slightly downstream for reading, or alternatively, to employ a combination write-read head. With this type apparatus, data may be written onto tape and then a few milliseconds later read off for verification. This greatly reduces the time between recording and verification but imposes greater speed constraints upon the verification apparatus.

The manner in which an error checking system operates and also the actual components used will depend to a large degree on the type of data being recorded. Different considerations and apparatus are employed in verifying digital data than in verifying analog data. With analog data, the verification operation must consider equal amplitude and rate of change of amplitude. With digital data, the verification operation is concerned with presence or absence of a threshold signal. While signal analysis may be less complicated when verifying digital data than when verifying analog data, timing, detection rate, and comparison rate considerations can be more complicated.

Digital data verification apparatus for read-after-write verification of information recorded on magnetic tape in the past has required large amounts of equipment and often was limited to incremental checking of the recorded data. Previous inventions were concerned with synchronizing writing and reading of data and the timing of both characters of information at a comparison circuit.

An object of this invention therefore is to provide an improved circuit for verifying digital data serially recorded onto magnetic tape.

Another object of this invention is to provide a circuit coupled to a dual write-read tape head for verifying data immediately upon its recording.

A further object of this invention is to perform verification in a continuous manner without the need for incremental or intermittant tape movement.

Another object is to provide a circuit for verifying data recorded onto magnetic tape by comparing the data read with the data written in a bit by bit manner wherein data is read onto tape and verification is performed in synchronism with pulses recorded onto tape and wherein there may be asynchronism between the writing on and the reading off of tape.

SUMMARY OF THE INVENTION

The objects of this invention are preferably accomplished by a verification circuit incorporated into a tape transport having a dual write-read head in which multi-bit characters of data can be recorded onto tape in serial-bit form. Recorded data may be verified immediately upon recording, in a continuous manner consonant with tape movement, by comparing recorded data read from tape with a copy of the data as written onto tape.

A pulse generator provides strobe pulses for controlling the operation of a parallel-to-serial converter such as an eight-bit shift register typically found in tape write circuitry. These pulses may also be recorded onto tape in synchronism with the recording of data. A temporary storage device such as a first-in, first-out matrix-register, whose operation may also be controlled indirectly by the strobe pulses, samples each eight-bit character passing through the shift register, whereupon every fourth synchronization pulse the four lowest bits in the shift register are non-destructively loaded into the matrix register. Recorded data, read from tape may then be compared with the data as stored in the matrix register.

Typically, each data bit read from tape is entered into a comparator such as an exclusive "or" circuit to be compared to a corresponding data bit as stored in the matrix register and as entered into the comparator by selection logic. Proper comparison can be effected by the strobe pulses read from tape. An error pulse is generated by a flip-flop associated with the comparator output.

DESCRIPTION OF THE DRAWINGS

The novel features of this invention, as well as the invention itself, both as to its construction and method of operation, will best be understood from the following description taken in connection with the accompanying drawings in which like characters refer to like parts, and in which.

DETAILED DESCRIPTION OF THE INVENTION

The present invention relates to an electrical circuitry and to a method for verifying digital data serially deposited on a magnetic recording medium such as a magnetic tape wherein data may be verified immediately upon recording without a disruption in the continuous movement of the tape, while the write process continues in operation, and without the necessity for synchronous operation between the write process and the read process. To this end, the invention is embodied in a tape transport unit having a dual write-read head and also having circuitry for converting parallel-bit data characters into serial-bit data characters. This tape unit is tied to and has its operation controlled by a computer processor.

Figure 1:
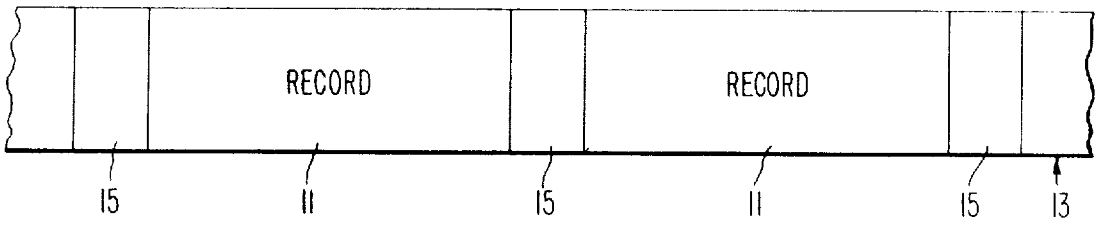
FIG. 1 is a representation of a typical tape record which is recorded and verified.

Data "records" 11, (FIG. 1) each comprising 256 eight-bit characters, are recorded on magnetic tape 13. Each 256 character "record" 11 is separated by a one-inch space 15 with each 8-bit character recorded serially, bit-by-bit so that each "record" is in single channel 2,048 bits long. In addition, a strobe channel 17 is established along the edge of the tape in which strobe pulses synchronized with the data bits are recorded.

Verification circuitry 19 (FIG. 2) receives 8-bit parallel data from a processor, a transmission terminal, or any other device providing data to the tape unit for recording. This circuitry 19 also transmits data serially to a write head 21, and receives serial data from a read head 23, both of which are portions of a dual magnetic head included in the tape unit. Strobe pulses generated by the circuitry 19 are recorded on tape 13 via write head 21. These pulses are received from tape 13 by the verification circuitry 19 via read head 23. Additional inputs to verification circuitry 19 are "read-enable" and "write-enable" signals from the processor. These signals are present during the recording and reading of each "record." In addition, "reset" signals are received by the circuitry 19 during the time or space between "records." When verification circuitry 19 detects a non-comparison, an error alarm signal is generated.

Figure 2:
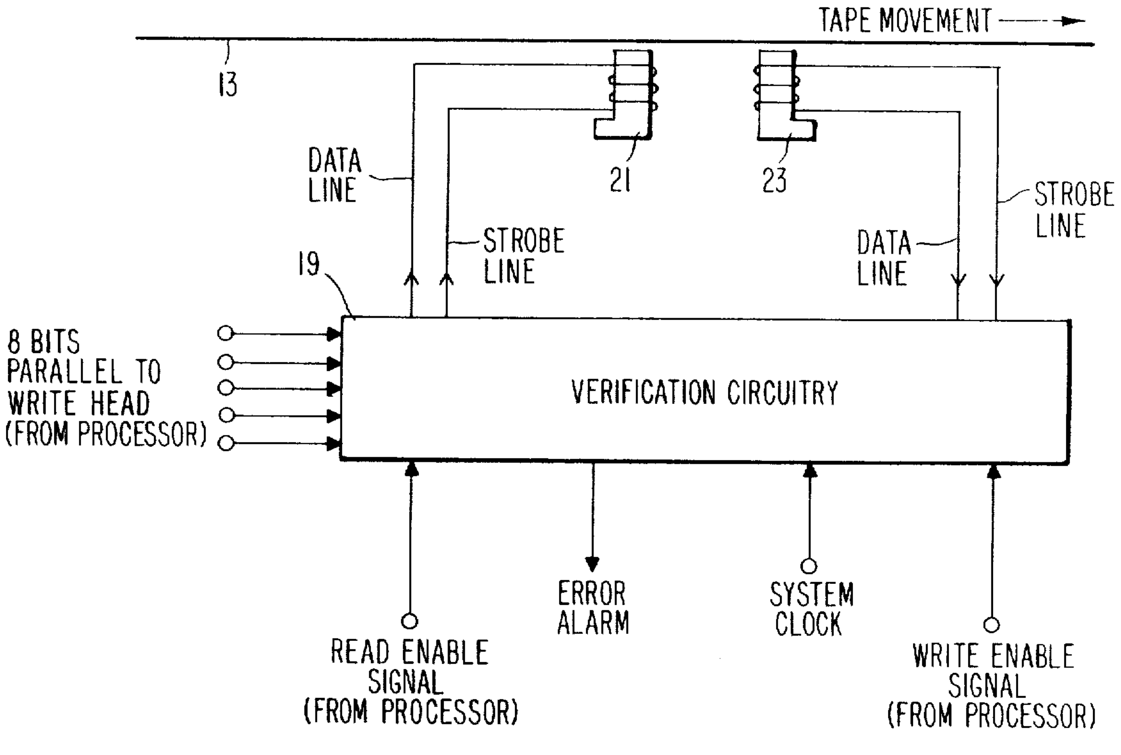
FIG. 2 shows a typical environment in which the verification circuitry operates.
Figure 3:
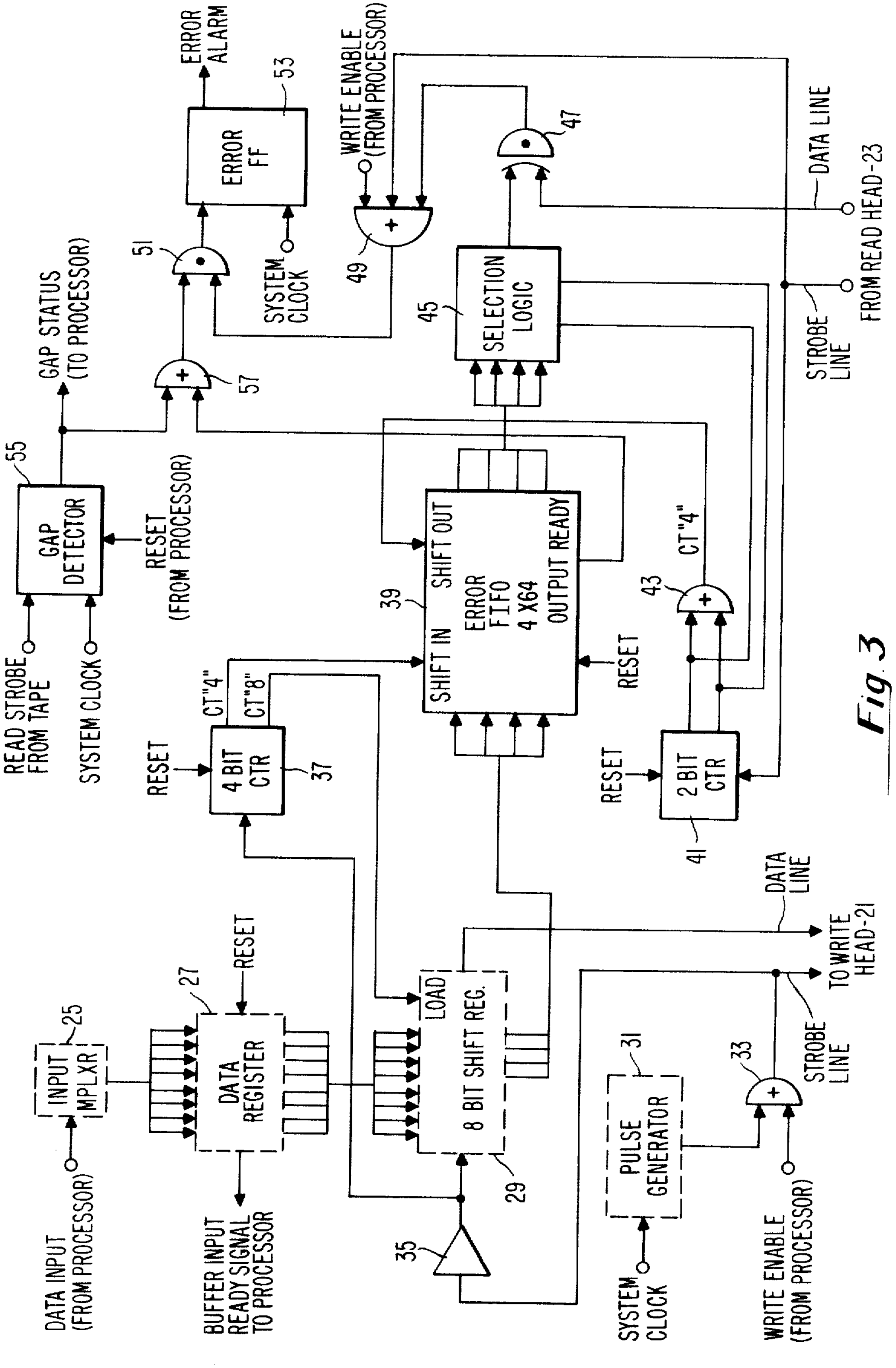
FIG. 3 is a logic diagram of the verification circuitry as shown in FIG. 2.

Logic diagram, FIG. 3, will aid in the understanding of the verification circuitry 19 in FIG. 2. Input multiplexor 25, parallel buffer register 27, and eight-bit shift register 29 can be found in a tape transport having bit-by-bit serial loading of eight-bit characters received from the computer processor. Each data character to be recorded is received in eight-bits parallel by an input multiplexor 25. The eight-bit input of a buffer register 27 has its inputs tied to the eight-bit output of the multiplexor 25, while the eight-bit parallel input of a shift register 29 is connected to the eight-bit output of buffer register 27. The serial output of the eight-bit shift register feeds a write head 21 (FIG. 2).

The improved verification circuitry 19 controls the operation of shift register 29 and includes a pulse generator 31, comprising a counter and a decoder for receiving 1 $\mu$s pulses from system clock and generating a 1 $\mu$s pulse every 125 $\mu$ seconds. A strobe generator gate 33 receives the pulses generated by pulse generator 31 together with a write enable signal from the processor to pass strobe pulses when enabled. The strobe pulses from strobe gate 33 are fed onto tape via write head 21 and to a shift register amplifier 35. Shift register amplifier 35 may include a 1 $\mu$s delay driver, the output of which clocks the eight-bit shift register 29 and a four-bit counter 37.

The four lowest bits of parallel output from eight-bit shift register 29 are connected to the input of a matrix error register 39. Register 39 is a 4 x 64 first-in first-out device (FIFO) which can hold 64 four-bit characters and which loads and dumps data by control signals on its "shift-in" and "shift-out" input terminals respectively.

A count of "8" from four-bit counter 37 controls the "load" input of eight-bit shift register 29 while a count of "4," and the multiples thereof, from four-bit counter 37 controls the "shift-in" input to FIFO register 39. Counter 37 is reset to zero after attaining a count of "8."

The strobe pulse read winding of read head 23 (FIG. 2) is tied to the clock input of a dual flip-flop, two-bit counter 41. The two inputs from this counter 41 are connected via "and" gate 43 to the "shift-out" input of FIFO register 39 so that a count of "4" from the counter 41 enables a "shift-out" or dump of the values on the output of FIFO register 39. Counter 41 is reset to zero after attaining a count of "4."

Selection logic 45 is tied to the output of FIFO register 39 and is controlled by the count from counter 41. The logic 45 comprises a common configuration of four three-input "and" gates, the outputs from which are "or" gated to produce the output of this logic 45. This selection logic 45 is enabled to selectively pass one bit at a time of each of the four bit characters appearing on the output of FIFO register 39 as counter 41 counts from 0 to 3 digitally. For example, a count of 0,0 will gate through the least significant bit, a count of 0,1 will gate through the next to the least significant bit, etc. The output of selection logic 45 is then fed to one input of a two-input "exclusive-or" gate 47.

"Exclusive-or" gate 47 is used for bit-by-bit comparison of the data which has been stored with the data as read from tape. To this end, the data read winding of read head 23 is tied to the other input of the "exclusive-or" 47.

The output of "exclusive-or" gate 47 is connected to one input of 3 input "and" gate 49. A second input of "and" gate 49 is tied to the strobe pulse winding from read head 23 while the third input of this gate 49 is tied to the write enable signal from the processor.

The output of "and" gate 49 is connected to one input of two-input "or" gate 51. The output of "or" gate 51 connects to the input of D-type error flip-flop 53. Error flip-flop 53 is clocked by the signals from system clock. The output of error flip-flop 53 becomes the error signal which is sent back to the processor.

A gap detector 55 is used to determine when an end of record occurs. Gap detector 55 is of a common configuration for counting 2,000 system clock pulses after the read strobe pulses have stopped. This count determines that a record must have ended. Incorporated into gap detector 55 is a binary counter which is capable of counting from zero to 2,000. This counter is reset to zero by every read strobe from tape and is clocked to count up by system clock pulses. A decoder is connected to the counter to detect when a count of 2,000 is attained. A D-type flip-flop is set by the decoder when the proper count is detected. This flip-flop is reset by a signal from the processor. The output from the gap detector 55 is the gap status which is sent to the processor and to one input of two-input "and" gate 57. The output-ready terminal of FIFO register 39, which signifies whether information resides in the output of FIFO register 39 or not, is connected to the other input of "and" gate 57. The output of "and" gate 57 is connected to the unused input of two-input "or" gate 51.

The operation of the verification circuitry is controlled and synchronized by the generated strobe pulses. That part of the circuitry which handles the data before it is recorded onto tape and which temporarily stores the data values as written onto tape is clocked and enabled by signals from the strobe generator. The part of the circuitry which handles the data read from tape, obtains data values as written in temporary storage and compares corresponding values for verification of data recording, is clocked by strobe pulses read from tape. In this manner the read process is completely independent of the write process. Any asynchronization between read and write is of little consequence upon the verification operation.

When in operation, data characters are loaded through the input multiplexor 25 into buffer storage 27 under the direction of the processor. During the "space" between records and after an end of record or after an error alarm is received by the processor the write enable signal is withdrawn and a reset signal is sent to the verification circuitry from the processor which clears buffer register 27, FIFO register 39 as well as resetting four-bit counter 37 and two-bit counter 41 and the output flip-flop of gap detector 55. Then upon the presence of a write enable signal from the processor, strobe pulses are gated to the circuitry.

The first strobe pulse clocks four-bit counter 37 which has been reset to generate count "8" and count "4" enables upon this initial clocking. A count "8" enable signal loads a character into shift register 29 while a count "4" enable signal controls the shift of register 39 to record the value of the four least significant bits of the character in register 29. Successive strobe pulses serially shift bits out of the register 29, least significant bits first, and to write head 21. Also upon every fourth strobe pulse the four least significant bits in register 29 are non-destructively read and stored into FIFO register 39. Upon every eighth strobe pulse a new character is loaded into shift register 29. In this manner, data characters are automatically fed to write head 21 in serial, bit-by-bit, fashion least significant bits first while the values of each character thus fed are recorded into FIFO register 39 as four-bit partial characters, least significant bits first. The strobe pulses are also fed to a winding of write head 21 to be recorded onto tape in a separate channel in synchronism with the data bits.

The lag time of data travel between the write head 21 and read head 23 is not critical in this invention. This lag time is a function of the physical distance between heads, the tape speed and any slippage in the mechanical tape advance apparatus. Typically, the separation time between heads is 15 milliseconds. Therefore, approximately 15 ms after recording data may be non-destructively read from tape for verification. As long as FIFO register 39 is chosen large enough to hold a sufficient quantity of characters, a lag time greater than occurred in this invention will easily be accommodated.

In the operation of the circuit, the data as written onto tape has been temporarily stored in FIFO register 39 in four-bit partical character form which must then be compared with the data being read on a bit-by-bit basis from the tape.

The first data bit from a record and the first strobe pulse of the train of strobe pulses accompanying the data record are simultaneously read from tape. This first data bit read is immediately compared with the first data bit stored by the "exclusive-or" 47. The first stored bit had been ready and waiting at the "exclusive-or" 47. During the "lag-time" that bit had been entered into FIFO register 39, had been made available on the output of FIFO register 39 and had been gated through the selection logic 45 by the resetting of two-bit counter 41 to be present on the appropriate input of the "exclusive-or" 47.

If the two bits do not compare, a non-comparison or error signal is gated through "and" gate 49, "or" gate 51 to be clocked through error flip-flop 53 to the processor.

In this same manner, each succeeding recorded bit is verified. Each present strobe pulse clocks two bit counter 41 to control selection logic 45 so that the next stored bit from FIFO 39 is waiting at the "exclusive-or" 47 for its corresponding data bit on tape. The component time delay permits enough time for the comparison of the previous data bit to occur.

Upon every fourth strobe pulse the next four-bit partical character is made available from the storage FIFO register 39. A count of "4" from counter 41 is gated through gate 43 to clock the shift-out terminal of FIFO 39. Upon every strobe pulse the selection logic 45 selects one of these available bits residing on the output of FIFO register 39 for comparison by "exclusive-or" 47 progressing from the least significant to the most significant bit.

The system operation as discussed so far will detect an error in the recorded data and will detect an error wherein data was recorded where an absence of data should be, i.e., improper erasure of a previous record. But, a problem may occur when part of a record is lost or is not recorded.

For this contingency, the gap detector 55 and associated gates 57, 51 come into play. The gap detector 55's primary function is to detect the gap or space between records. However, when this gap is really a loss of record a gap status is produced which appears on an input of and gate 57. Since the condition is actually a loss of record, the copy of the part of the record not verified is remaining in the FIFO register 39. This condition produces an output ready enable on and-gate 57 which then passes the gap signal to load the error flip-flop 53 via gate 57. The processor therefore receives gap status and error alarm simultaneously, signifying a loss-of-record error.

Since many different embodiments of this invention, as to the above-described apparatus and method, could be made without departing from the scope thereof, it is intended that all matter contained in the above description or shown in the accompanying drawings shall be interpreted as illustrative and not in a limiting sense.

What is claimed is:

1. Apparatus, receiving and sending signals to a digital processor, for bit-by-bit verification, immediately upon recording, of digital data serially recorded onto a magnetic medium, including a dual write-read head and a shift register having a parallel input and output and a serial output connected to the write portion of said dual head, comprising:

means for generating strobe pulses and then feeding same to said recording head, said means being connected to said write head;

means responsive to said generated strobe for controlling the shifting of said shift register;

means connected to said read head for comparing data as read from said medium with characters recorded on a bit-by-bit basis;

means associated with said comparison means for generating an alarm when respective bits do not compare;

a first-in, first-out matrix register having parallel input and output, shift-in and shift-out controls and output ready terminal, said inputs of said matrix register being connected to a portion of the parallel output of said shift register;

a first counter means connected to said strobe generating means, for providing a first signal output and a second signal output, said first signal output being connected to said shift-in terminal of said matrix register, said second signal output being connected to said load control of said shift register;

a second counter connected to the strobe pulse read head winding; and a first and-gate with inputs connected to the output of said second counter.

2. The apparatus of claim 1 wherein said counter means includes:

a binary counter, said counter being clocked by strobe pulses from said driver gate;

a first decoder, said decoder being connected to said binary counter and being capable of passing said first signal when said counter attains a value equal to the bit capacity of said shift register; and a second decoder, said decoder being connected to said binary counter and being capable of passing said second signal when said counter attains a value equal to a multiple of the bit count of an equal portion of the bit capacity of said shift register.

3. The apparatus of claim 2 wherein said first and-gate is connected to said second counter so as to pass an enable signal when said second counter attains a value equal to the bit count of an equal portion of said capacity of said shift register.

4. The apparatus of claim 3 wherein said shift register is an eight bit shift register and wherein said bit count value, said second decoder attains is four.

5. The apparatus of claim 4 also including:

means associated with said comparison means for generating an alarm when respective bits do not compare; and means associated with said read head for detecting an absence of record and for alarming when said absence is detected in the presence of said stored characters.

6. The apparatus of claim 5 wherein said alarm generating means includes:

a second two-input "or" gate, one input being connected to the output of said second two-input and-gate; and a D-type flip-flop, the input of which is connected to said or-gate's output and the clock input of which is tied to said strobe pulse read head winding.

7. The apparatus of claim 6 wherein said detecting and alarming means includes:

a gap detector, said detector being clocked by system clock and reset by each strobe pulse read from tape;

a second two-input "and" gate, with inputs of said gate connected to said gap detector and said output ready terminal respectively.

8. The apparatus of claim 7 wherein said comparing means includes:

selection means tied to the output of said matrix register and to the output of said second counter for selectively gating through a bit on the output of said matrix register as a function of the count received from said second counter; and an exclusive-or gate, said gate having one input connected to the output of said selection means and the other input connected to the output of said first flip-flop.

* * * * *